A. W. COPLEY.
PEN FOR RECORDING METERS.
APPLICATION FILED MAR. 20, 1913.

1,258,317. Patented Mar. 5, 1918.

WITNESSES:
Fred H Miller
J H Procter

INVENTOR
Almon W. Copley
BY
Wesley G. Carr
ATTORNEY

UNITED STATES PATENT OFFICE.

ALMON W. COPLEY, OF WILKINSBURG, PENNSYLVANIA, ASSIGNOR TO WESTINGHOUSE ELECTRIC AND MANUFACTURING COMPANY, A CORPORATION OF PENNSYLVANIA.

PEN FOR RECORDING-METERS.

1,258,317.  Specification of Letters Patent.  Patented Mar. 5, 1918.

Application filed March 20, 1913. Serial No. 755,783.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Pens for Recording-Meters, of which the following is a specification.

My invention relates to marking pens, and particularly to pens of the reservoir type which are adapted for use with graphic or recording instruments.

One object of my invention is to provide a pen of the character above indicated that shall be simple in construction, capable of operation for long periods of time without refilling, light in weight and adapted to insure a uniform flow of ink.

Another object of my invention is to provide means for so supporting and positioning the fluid-conducting member between the reservoir and the pen that the energy required to actuate the pen may be a minimum.

Reservoir pens have heretofore been constructed, in which the ink is fed directly from the reservoir through a constricted opening which constitutes the marking point. This necessitated that the moving arm or pointer of the instrument should carry the reservoir or a conductor from the reservoir, and, in consequence thereof, the instrument mechanism had to be made proportionally strong and develop a relatively high torque.

Numerous other types of marking pens have been constructed among which a good example consists of a V-shaped receptacle with a constricted opening or projection used as the marking point. Pens of this type usually have very small reservoirs that require frequent filling.

According to my present invention, I provide a novel pen structure which combines the desirable features of the V-shaped pens and the reservoir pens, while, at the same time, the reservoir is stationary and the ink is transmitted through an independently-supported conducting member to the pen by capillary and siphon action, and from the pen to the paper by capillary action.

Figure 1:
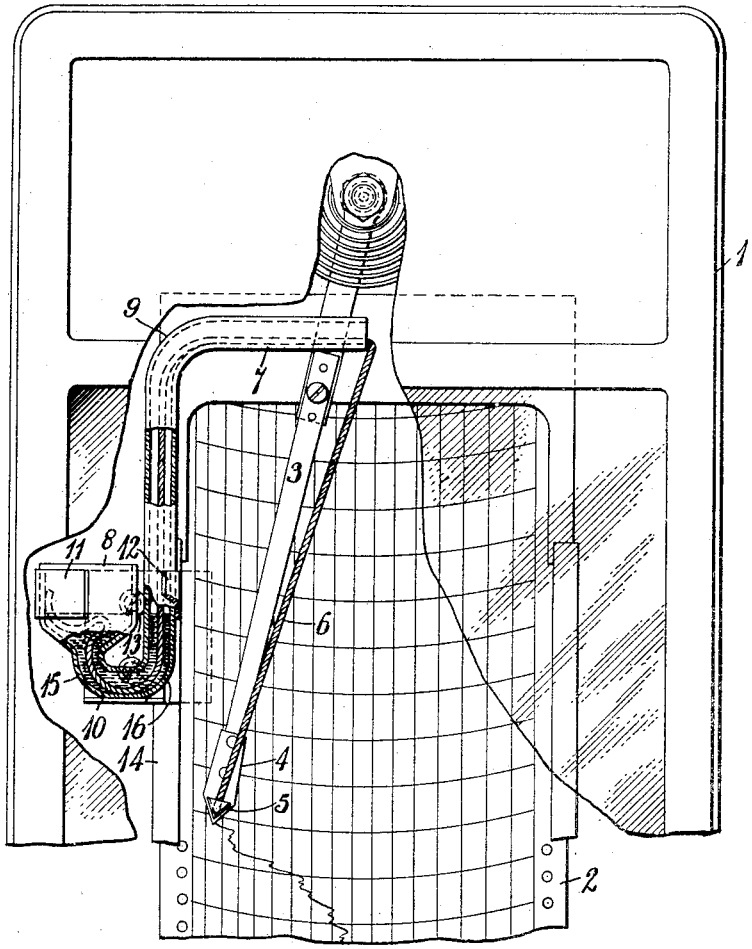
Figure 2:
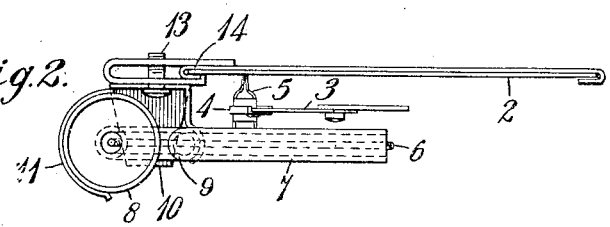
Figures 3, 4:
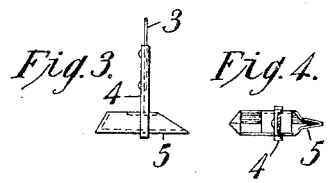

The features of novelty can be seen more clearly from the accompanying drawings of which Figure 1 is an elevation of a part of a graphic recording instrument showing the pen and reservoir partly in elevation and partly in section. Fig. 2 is a plan view of the details of the invention. Fig. 3 is a side elevation of the pen, and Fig. 4 is a plan view of the same.

The invention, as here shown, embodies a graphic electrical measuring instrument 1 which, by its mechanism, (not shown) operates a roll of paper 2 and a pen arm 3 having affixed to its lower end a pen holder 4 and a V-shaped pen 5 provided with a constricted opening which feeds the ink to the paper by capillary action. The ink which is received by pen 5 is transmitted thereto, by siphon action, through a piece of yarn 6 that extends from pen 5 to the opening of a glass tube 7 and thence through the tube to the bottom of a reservoir 8. The entire piece of yarn 6 is supported by the tube 7 independently of the pen arm 3. Reservoir 8 is a glass cylinder with its bottom arranged to receive the glass tube 7 which is bent to right angles at points 9, 15 and 16, and extends to a point opposite the center of paper 2 and considerably higher than reservoir 8. Reservoir 8 is held in position by a bracket 10 which has two spring arms 11 and 12, the former arranged to hold the reservoir 8 and the latter arranged to hold the tube 7 in place. Bracket 10 is held in position by screws 13 which extend through the back of the bracket 10 to its other side, the bracket being doubled back upon itself to form a clip which fits over a paper guide 14. The height of the bracket 10, and, consequently, that of the reservoir 8, may be altered by loosening screws 13, moving the bracket to any desired height and then tightening the screws again to clamp the paper guide 14 between the bracket arms; in this way, the flow of ink may be regulated. Another method of regulating the flow of ink would be to substitute a yarn of different absorbing and capillary qualities for the yarn 6.

Ink will feed freely and constantly from reservoir 10 through tube 7, with the aid of yarn 6, to the pen 5, and thence to paper 2, when the bracket 10 is placed in the correct position with respect to the pen 5.

The action of the pen is as follows: The end of the yarn 6 which is immersed in the ink in the reservoir 8 becomes saturated with ink, and, by capillary action, the entire yarn becomes saturated. After the yarn 6 becomes saturated, the ink continues to flow through tube 7 to pen 5 by siphon action and from pen 5 to paper 2 through the constricted marking point by capillary action. Care must be taken to prevent the ink from splashing on the outer surface of the pen 5, for such action would cause a surplus amount of ink to be siphoned over to the pen 5 from the ink reservoir 8.

I do not limit my invention to this particular shape or texture of the reservoir, yarn, tube or pen, herein described, but modifications of shape and texture of either or all of the elements embodied therein may be made without departing, in any way, from the spirit of my invention.

I claim as my invention:

1. A marking device for a recording instrument comprising a relatively stationary reservoir having a tube extending therefrom to a point substantially above the center of the recording surface of the instrument, a pen and a piece of yarn extending from the reservoir through the tube to the pen and supported by the outer end of the tube.

2. A marking device for a recording instrument comprising a relatively stationary reservoir having a tube extending therefrom upwardly and laterally to a point substantially above the center of the recording surface of the instrument, a pen and a flexible capillary conductor extending from the reservoir through the tube to the pen and supported independently of the pen.

3. In a recording instrument, the combination with a record blank and a pen, of a reservoir having a tube extending therefrom to a position substantially above the center of the record blank, and a piece of yarn extending from the reservoir through the tube to the pen and supported independently of the pen.

In testimony whereof, I have hereunto subscribed my name this 17th day of March, 1913.

ALMON W. COPLEY.

Witnesses:
D. R. KUNKEL,
B. B. HINES.

Copies of this patent may be obtained for five cents each, by addressing the "Commissioner of Patents, Washington, D. C."